United States Patent
Hynecek

(10) Patent No.: US 7,079,178 B2
(45) Date of Patent: Jul. 18, 2006

(54) HIGH DYNAMIC RANGE ACTIVE PIXEL CMOS IMAGE SENSOR AND DATA PROCESSING SYSTEM INCORPORATING ADAPTIVE PIXEL RESET

(76) Inventor: Jaroslav Hynecek, 905 Pampa Dr., Allen, TX (US) 75013

( * ) Notice: Subject to any disclaimer, the term of this patent is extended or adjusted under 35 U.S.C. 154(b) by 900 days.

(21) Appl. No.: 10/059,546

(22) Filed: Jan. 28, 2002

(65) Prior Publication Data
US 2002/0113886 A1 Aug. 22, 2002

Related U.S. Application Data

(60) Provisional application No. 60/269,554, filed on Feb. 20, 2001.

(51) Int. Cl.
*H04N 5/228* (2006.01)
(52) U.S. Cl. .................. 348/222.1; 348/297; 348/364; 250/208.1
(58) Field of Classification Search ................ 348/302, 348/222.1, 312, 364, 297; 250/208.1
See application file for complete search history.

(56) References Cited

U.S. PATENT DOCUMENTS

| | | | | |
|---|---|---|---|---|
| 5,541,654 A | * | 7/1996 | Roberts | 348/301 |
| 5,812,191 A | * | 9/1998 | Orava et al. | 348/308 |
| 6,008,486 A | * | 12/1999 | Stam et al. | 250/208.1 |
| 6,175,383 B1 | * | 1/2001 | Yadid-Pecht et al. | 348/302 |
| 6,230,975 B1 | * | 5/2001 | Colley et al. | 235/462.06 |
| 6,549,234 B1 | * | 4/2003 | Lee | 348/302 |
| 6,927,793 B1 | * | 8/2005 | Seitz et al. | 348/230.1 |
| 6,933,973 B1 | * | 8/2005 | Sako | 348/308 |
| 6,946,635 B1 | * | 9/2005 | Pine | 250/208.1 |
| 2002/0027606 A1 | * | 3/2002 | Yadid-Pecht | 348/298 |
| 2002/0134911 A1 | * | 9/2002 | Zarnowski et al. | 250/208.1 |

OTHER PUBLICATIONS

Dierickx, et al., Random Addressible 2048 x 2048 Active Pixel Image Sensor, IEEE Transactions on Electron Devices, vol. 44, Issue 10, Oct. 1997, pp. 1716-1720.*

* cited by examiner

*Primary Examiner*—Tuan Ho
*Assistant Examiner*—Gary C. Vieaux
(74) *Attorney, Agent, or Firm*—John E. Vandigriff

(57) ABSTRACT

A high Dynamic Range Active Pixel CMOS image sensor architecture has incorporated therein an adaptive pixel reset. The individual sensor pixels are reset only when accumulated charge, or the integration time exceeds certain predetermined limits. The reset is skipped when the integrated charge signal in a given pixel is low. The accumulated number of reset skips in a given time frame, together with the standard analog output, is used to calculate the sensor high DR output signal. A signal processing system is used to simultaneously process both sensor analog and digital outputs.

11 Claims, 4 Drawing Sheets

HIGH DYNAMIC RANGE ACTIVE PIXEL CMOS IMAGE SENSOR AND DATA PROCESSING SYSTEM INCORPORATING ADAPTIVE PIXEL RESET

PRIORITY

Priority is based upon Provisional application Ser. No. 60/269,554, filed Feb. 20, 2001.

FIELD OF THE INVENTION

The invention relates to solid-state image sensors and imaging systems, specifically to Active Pixel CMOS Image Sensors (APS) and imaging systems that have high Dynamic Range (DR) achieved by resetting the pixels of the array individually corresponding to the level of integrated charge.

BACKGROUND OF THE INVENTION

A typical image sensor senses light by converting impinging photons into electrons and collecting (integrating) them in sensor pixels. After the integration cycle is completed charge is converted into a voltage that is supplied to the output terminals of the sensor. An example of pixel circuit diagram (101) for an advanced active pixel CMOS image sensor array (100) is shown in FIG. 1. In this example, the charge to voltage conversion is accomplished by integrating charge in a special potential well 102 of a p-channel transistor 103 (U.S. patent provisional application 60/245,942 to Hynecek). Integrated charge causes change in the threshold voltage of transistor 103. Turning on the row addressing transistors 104, and supplying a small bias current to the pixels from the drain bias terminal 110 through the column current sources 116, senses the pixel outputs and drives the column sense lines 105. After the pixel signal is transferred to the horizontal scanner-buffer 112, and is scanned out, transistors 107 reset the pixels in selected rows. The pixel reset can alternately be performed immediately after the signal transfer into the buffer if the buffer is provided with a row data storage capability. The pixel reset is accomplished by applying pulse 117 to the reset transistor gate buss 109. The reset causes charge collected in the potential wells 102 to flow out into the drains 111. In the next step a clocking pulse is applied to the clocking terminal 115 of the vertical scanner 113, and the next row 106 of the array 100 is processed. The vertical scanner is initiated by a pulse applied to terminal 118. The sequence is repeated until the whole array is scanned. Horizontal column scanning is accomplished by applying clocking pulses to the horizontal scanner clocking input 114 and the register is initiated by pulse applied to the terminal 119. The pixel signal is delivered to the sensor output terminals 116 via the buffer amplifier 108.

Another example of the pixel suitable for use in this invention is described in the U.S. Pat. No. 6,091,280 to Hynecek. It is clear to those skilled in the art that any pixel that is reset through the column lines rather then through the row lines can be used in this invention. For the sake of brevity the description of many such pixels will not be given here.

The above-described array scanning method is known in the art as the "rolling shutter scan". Each line has the same charge integration period length, but the integration does not start and stop simultaneously for all the rows of the array as in the "snap shot mode".

Both the snap shot and the rolling shutter scanning modes have a disadvantage in limiting the sensor DR. For brightly illuminated pixels, it is necessary to have a short integration time, while for dimly illuminated pixels, it is desirable to extend the integration period as long as possible to integrate more charge. However, when all the pixels of the same row, or the whole array, are reset simultaneously, they all have the same integration time. The sensor DR is then given by the ratio of the maximum pixel well capacity to the pixel noise floor.

By modifying the standard architecture of the typical CMOS image sensor array, and providing selective pixel reset to each pixel individually in each row or in the whole array, depending on the amount of integrated charge, eliminates this common drawback. The present invention thus provides a significant DR advantage in comparison to the standard CMOS image senor architectures as well as to all standard CCD image sensor architectures where the pixels in one row are always reset at the same time.

SUMMARY OF THE INVENTION

The present invention provides practical and simple CMOS image sensor architecture that allows for individual pixel resets based on the amount of integrated charge in each pixel. By incorporating additional horizontal register into the sensor chip that stores the row pixel reset information, it is possible to selectively skip the reset for pixels that are dimly illuminated. The high DR image sensors are capable of resolving image details simultaneously in both; highly illuminated as well as in the dark areas of the image without loss of contrast or signal clipping. This significantly improves performance of the sensor, and achieves high DR and other objects of the invention.

BRIEF DESCRIPTION OF DRAWINGS

The invention will be described in detail in the following description of preferred embodiments with reference to the following figures wherein.

DETAIL DESCRIPTION OF PREFERRED EMBODIMENTS

Figure 1:
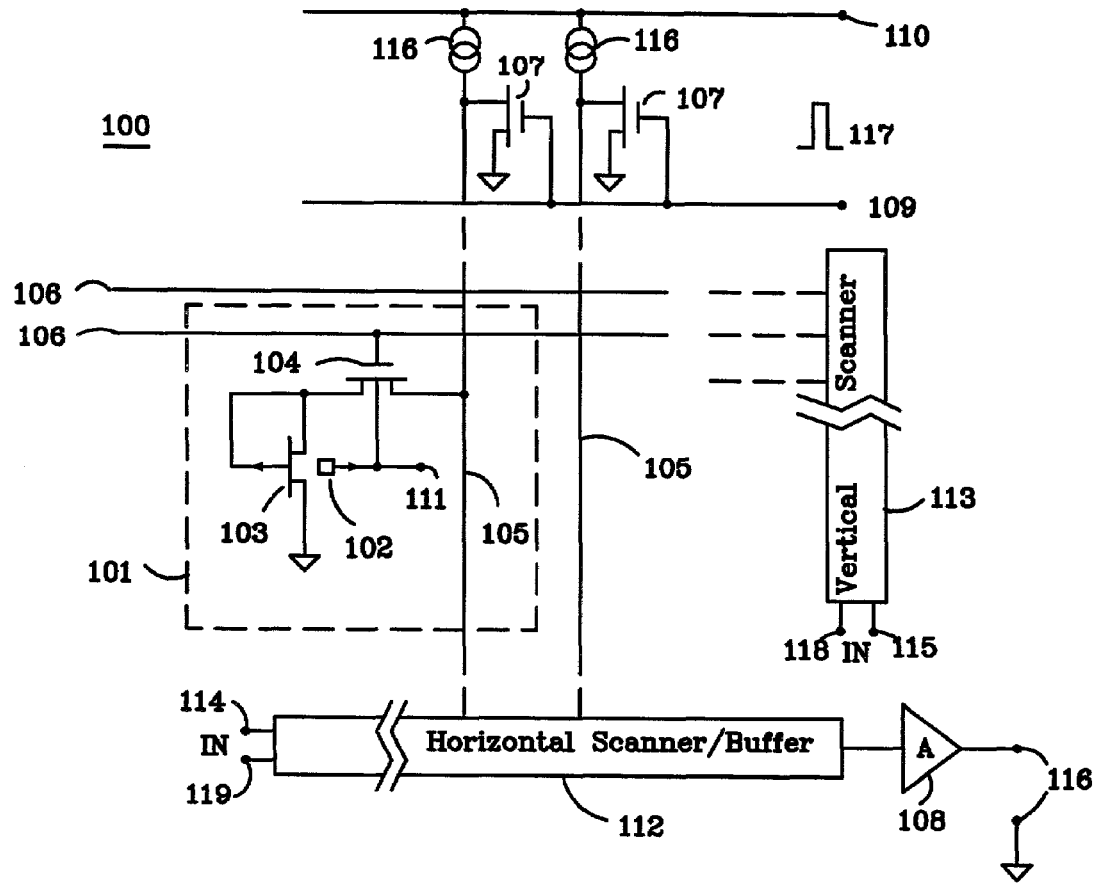
FIG. 1 is a schematic circuit diagram of a typical prior art CMOS sensor pixel that is incorporated into an array in which the pixels in one addressed row are reset simultaneously.
Figure 2:
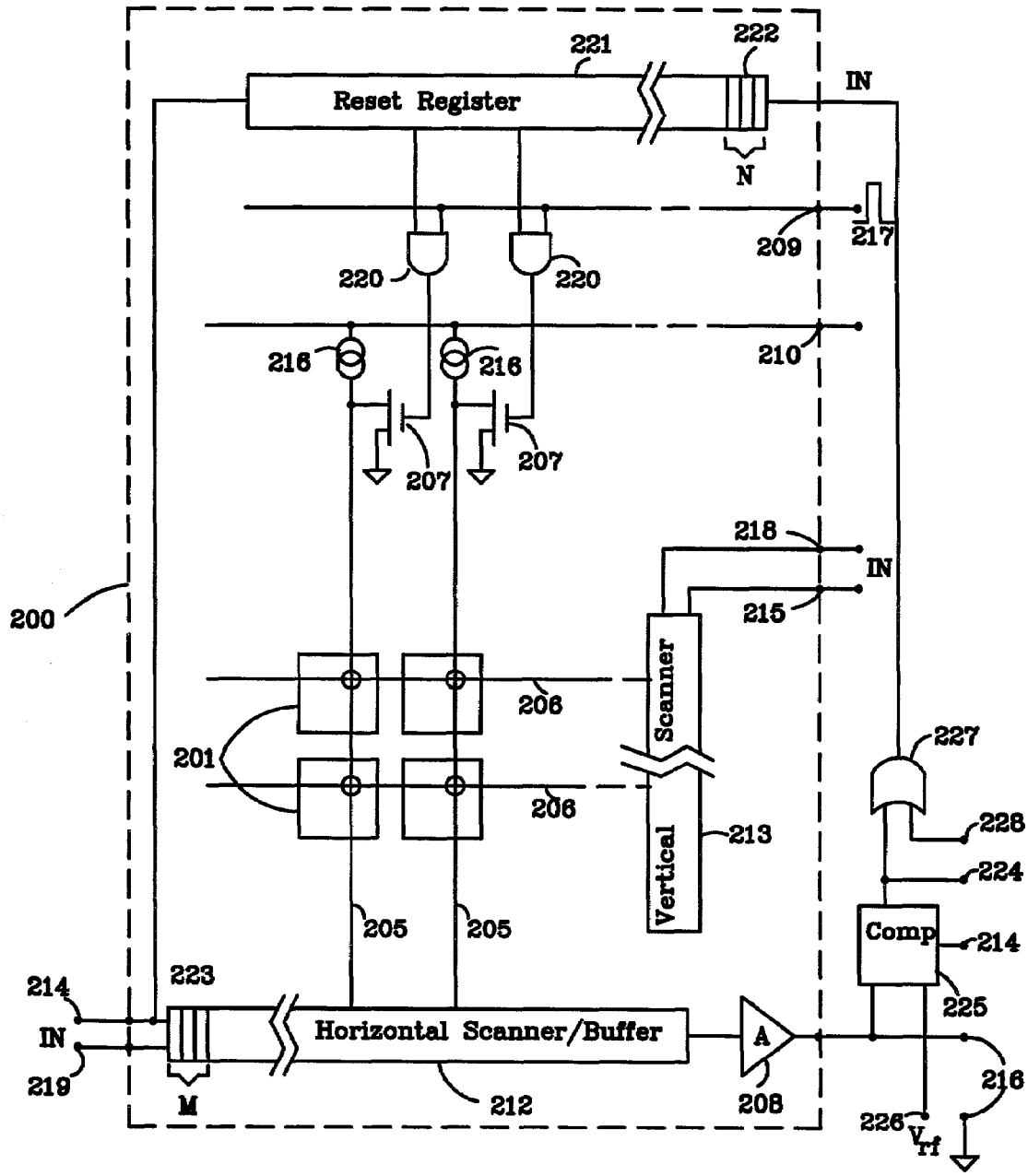
FIG. 2 is a circuit block diagram of the present invention incorporating an additional serial register in the sensor chip that stores the row pixel reset information.

In FIG. 2, the block diagram of sensor 200 of the present invention is shown. The diagram also shows the details of the column sense line biasing circuits and the reset logic circuits. The pixels in one row are selectively reset depending on the data loaded into the reset register. The circuit is similar to the diagram of the sensor shown in FIG. 1 with the major additions being the reset register 221 and the reset logic gates 220. Pixels 201 are addressed as previously by row signals supplied through the lines 206 from the vertical scanner 213. Pulses applied to the register clocking input 215 clock the scanner and the scan is started by applying the starting pulse to terminal 218. The pixel signal is transferred on the vertical column lines 205, and further into the horizontal scanner-buffer 212. The pulses applied to the terminal 214 clock the horizontal scanner and the pulse applied to the terminal 219 starts the scan. M dummy stages 223 have been added to the beginning of the horizontal scanner, which cause the pixel signal to appear at the output with a predetermined delay. The pixel output is buffered by the amplifier 208 and supplied to the chip output terminals 216. Biasing current is supplied to the pixels from the Vdd terminal 210 through the column current sources 216. A comparator 225 is connected to the output terminal 216, and the pixel output signal is compared with a reference voltage 226. Applying the same clocking signal as to the serial register to the comparator terminal 214 synchronizes its output with the pixel readout, however, some latency L=(N−M) may be necessary to accomodate. When the pixel output is smaller than the reference voltage Vref, the comparator digital output 224 is low. When the pixel output is larger than the reference, the output 224 becomes high. The comparator output is provided to the image processing system as the sensor digital output, and is also loaded into reset register 221 through N dummy stages 222 that, together with the M dummy stages 223, compensate for comparator latency. Depending on the system status, it may sometimes be desirable to override the comparator 225 output. This is accomplished by incorporating a logic gate 227 and an override input 228 into the circuit. After the horizontal scan is completed, reset register 221 becomes loaded with data that exactly correspond to the pixels whose signal exceeded the reference. By applying a reset pulse 217 to terminal 209, and using the data from the register via the logic gates 220, only the pixels with the high output are reset by transistors 207. As a result, the low output pixels continue to integrate charge. Comparator 225 and the voltage reference 226 may be integrated on the same chip with the pixel array.

Figure 3:
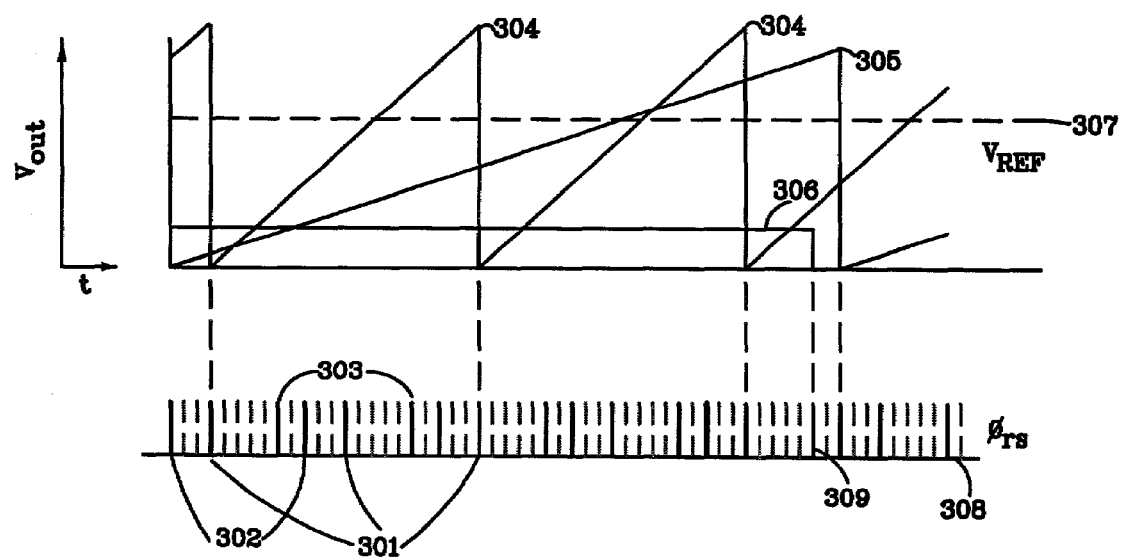
FIG. 3 shows a diagram of the sensor output for three different pixels of the array that are illuminated with three different light intensities.

FIG. 3 shows a diagram that superimposes three different pixel outputs that would appear on the column sense lines if the addresses for these pixels were permanently but separately turned on. The diagram shows the reset pulses 308 supplied to terminal 217 in FIG. 2 for the purposes of time reference, and it also shows the comparator voltage reference level 307. The output 304 corresponds to the brightly illuminated pixel; output 305 is from a medium illuminated pixel, and the output 306 is for the pixel with minimum illumination. The pixel-reset pulses are also shown in the graph to provide the necessary time reference. For simplicity, a sensor with only 10 lines is considered. The pixel of the row that is addressed when the reset pulse group 301 is applied has the highest illumination level. This pixel is being reset by every other reset pulse. The sensor supplies to the output only one reset skip, and one analog signal level corresponding to the ramp peak 304. The pixel of the row addressed, when the reset group 302 is applied, is illuminated with the medium light intensity. This pixel is reset every 5-th reset pulse, and the analog value that is supplied to the output corresponds to the ramp peak 305. The problem occurs when the pixel is not illuminated. The output grows very slowly, and the pixels would be represented by an excessive amount of reset skips. Resetting these pixels when the reset skip count exceeds a given predetermined number, for example, at the time indicated by pulse 309, alleviates this problem. The resulting reset interval is then the standard frame integration time of the sensor. The only difference here is that there may be no common synchronization of the integration times for the pixels that operate in this mode. Each pixel of the array has its own integration sequence that varies with the illumination up to a fixed maximum. The pixel timing is not phase synchronized with the rest of the pixels in the array and can change only in discrete increments as determined by the reset clock pulses 308.

Figure 4:
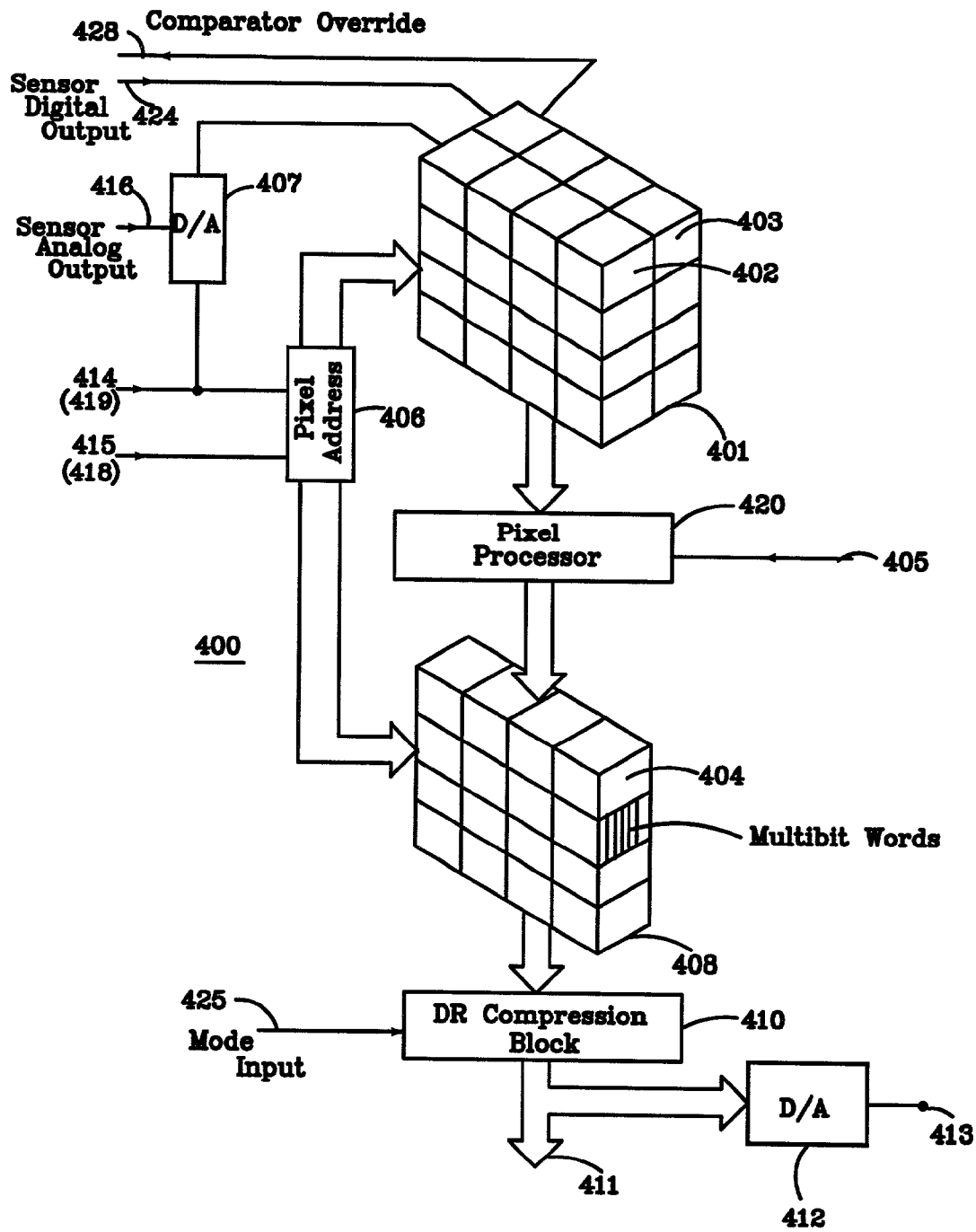
FIG. 4 illustrates an example of a image sensors pixel data mapping into the system memory, and the pixel data processing to obtain the high DR output.

FIG. 4 shows a diagram of an example of one possible implementation of the system data processing arrangement. The sensor pixel analog output 416 is digitized in the A/D converter 407 and is mapped into the image of pixels 402 in the memory array 401. The corresponding digital sensor output 424 is loaded into the image of the pixels 403 of the same memory array 401. This section of the memory 401 has also an ability to generate override signal 428 if the count of the reset skips in any particular pixel image 403 exceeds a certain predetermined limit. The memory image of the sensor pixels is addressed by the addresses generated in the address generator 406. The generator may be using both of the horizontal and vertical scanner clocks 414 and 415 and it may also use the start up pulses (419 and 418) for this purpose. The memory image of the sensor pixels 401 is scanned and processed by the pixel processor block 420 to recover the standard digital format of the sensor pixel signal in the form of n-bit pixel words 404. The clock line 405 supplies the necessary memory-scanning clock that may not be related to the sensor scanning clocks. The output of the pixel processor 420 is stored in another memory array 408. The output of the memory 408 is further processed to suitably compress the digital signal in a DR compressor block 410 to make it useable for viewing. The block 412 performs the necessary D/A conversion, if needed. The final compressed analog output is supplied to the display through the interface terminal 413. The digital output 411 is also available from the system for further digital processing or digital display. The DR compressor block 410 is controlled through the mode selection input 425. Many modifications of this general data flow are possible including other more sophisticated signal processing schemes that can easily be devised by those skilled in the art. The key difference of the presented concept from other know approaches, however, resides in the reconstruction of the high DR digital pixel signal from the sensor analog data and the pixel reset skip count. It is the combination of both; the sensor analog output and the sensor digital output that makes the high DR sensing possible.

Having described preferred embodiments of the novel high DR CMOS image sensor and imaging system whose pixels incorporate adaptive pixel reset, which are intended to be illustrative and not limiting, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed:

1. A CMOS Active Pixel image sensor, comprising:
an array of CMOS sensor pixels;
pixel addressing means, including a vertical scanner;
pixel read out means, including a horizontal scanner-buffer;
a reset register, including reset logic gates; and
a comparator, with an override capability, connected to the output of the CMOS sensor array, and said comparator compares the pixel output levels to a given reference level, wherein a digital output from the comparator is loaded into a reset register and is also supplied to a data processing system as a pixel digital sensor output.

2. The image sensor according to claim 1, wherein said image sensor includes pixels that can be individually reset at different times independently of the time of readout.

3. The image sensor according to claim 1, wherein a reset signal from the reset register is supplied to the pixels by column addressing means rather than by row addressing means.

4. The image sensor according to claim 1, wherein pixel-reset data is stored in the reset register, and is loaded into the said reset register approximately simultaneously with pixel readout.

5. The image sensor according to claim 1, wherein selected pixels are reset after the reset register loading is complete at the end of the row read out.

6. The image sensor according to claim 1, including means for skipping pixel reset if the pixel output is below a certain threshold, and where the pixel is allowed to integrate more charge before it is eventually reset.

7. The image sensor according to claim 1, including a signal processing system that is using both the analog and digital data obtained from the array of CMOS sensor pixels to form a high Dynamic Range (large n-bit word) digital pixel data.

8. The image sensor signal processing system according to claim 7, wherein the signal processing system includes pixel memory locations with the ability to store digitized sensor analog pixel outputs and several frames of pixel reset skip count outputs, and includes means to generate a pixel override output when any pixel skip counting memory locations overflows a predetermined limit.

9. The image sensor signal processing system according to claim 7, including means to compute, on a pixel-by-pixel basis, high Dynamic Range (large n-bit word) pixel data from digitized pixel analog data, and from accumulated reset skip counts.

10. The image sensor signal processing system according to claim 9, including means to process high Dynamic Range (large n-bit word) pixel data, store the data in suitable memory pixel locations, and to compress the data in a suitable compression algorithm to form pixels with smaller in-bit word sizes where m<n.

11. A CMOS Active Pixel image sensor, comprising:
an array of CMOS sensor pixels;
pixel addressing means, including a vertical scanner;
pixel read out means, including a scanner-buffer;
a reset register, including reset logic gates;
a comparator, with an override capability, connected to the output of the CMOS sensor array, and said comparator compares the pixel output levels to a given reference level, wherein a digital output from the comparator is loaded into a reset register and is also supplied to a data processing system as a pixel digital sensor output; and
pixels in said array that can be individually reset at different times independently of time of readout.

* * * * *